United States Patent
Wijayapala et al.

(10) Patent No.: US 11,999,874 B2
(45) Date of Patent: Jun. 4, 2024

(54) THERMOPLASTIC POLYMER AND METHOD OF FORMING THE SAME

(71) Applicant: Mississippi State University, Starkville, MS (US)

(72) Inventors: Rangana Wijayapala, Starkville, MS (US); Santanu Kundu, Starkville, MS (US); Bill Elmore, Starkville, MS (US); Charles Freeman, Starkville, MS (US)

(73) Assignee: Mississippi State University, Starkville, MS (US)

( * ) Notice: Subject to any disclaimer, the term of this patent is extended or adjusted under 35 U.S.C. 154(b) by 407 days.

(21) Appl. No.: 16/847,583

(22) Filed: Apr. 13, 2020

(65) Prior Publication Data
US 2020/0325271 A1    Oct. 15, 2020

Related U.S. Application Data

(60) Provisional application No. 62/833,463, filed on Apr. 12, 2019.

(51) Int. Cl.
| | |
|---|---|
| *C08G 63/48* | (2006.01) |
| *C08G 63/06* | (2006.01) |
| *C08L 91/00* | (2006.01) |
| *C09F 7/06* | (2006.01) |

(52) U.S. Cl.
CPC .............. *C09F 7/06* (2013.01); *C08G 63/06* (2013.01); *C08G 63/48* (2013.01); *C08L 91/005* (2013.01)

(58) Field of Classification Search
CPC ........... C09F 7/06; C08G 63/06; C08G 63/78; C08L 91/00
See application file for complete search history.

(56) References Cited

U.S. PATENT DOCUMENTS

2014/0345797 A1* 11/2014 Li .................. B32B 37/1284
528/297

FOREIGN PATENT DOCUMENTS

JP    2000507571 A  *  6/2000

OTHER PUBLICATIONS

Dinda, et al., Epoxidation of cottonseed oil by aqueous hydrogen peroxide catalysed by liquid inorganic acids, Bioresource Technology 99 (2008) 3737-3744.
Liu, et al., Polymers from Fatty Acids: Poly($\omega$-hydroxyl tetradecanoic acid) Synthesis and Physico-Mechanical Studies, Biomacromolecules, 2011, 12, 3291-3298.

* cited by examiner

*Primary Examiner* — Tae H Yoon
(74) *Attorney, Agent, or Firm* — Stites & Harbison PLLC; Richard S. Myers, Jr.

(57) ABSTRACT

Provided are a thermoplastic polymer and a method of forming a thermoplastic polymer. The thermoplastic polymer includes a thermoplastic polymer including one or more fatty acids derived from a plant-based oil. In some embodiments, the thermoplastic polymer includes a structure according to the formula $(C_{18}H_xO_2)_y$, wherein each x is individually selected from the group consisting of 32 and 33, and wherein y is between 1 and 300. The method of forming a thermoplastic polymer including epoxidizing a plant-based oil to form an epoxidized plant-based oil; saponifying the epoxidized plant-based oil to separate the fatty acids from the glycerol; and then polymerizing the separated fatty acids to form the thermoplastic polymer.

11 Claims, 5 Drawing Sheets

THERMOPLASTIC POLYMER AND METHOD OF FORMING THE SAME

RELATED APPLICATIONS

This application claims the benefit of U.S. Provisional Application Ser. No. 62/833,463, filed Apr. 12, 2019, the entire disclosure of which is incorporated herein by this reference.

TECHNICAL FIELD

The present invention relates to thermoplastic polymers and methods of forming thermoplastic polymers. In particular, the presently-disclosed subject matter relates to thermoplastic polymers formed from plant oil fatty acid and methods of forming thermoplastic polymers from plant oil fatty acid.

BACKGROUND

Global thermoplastic demand is rising steeply due to population growth and industrialization. Traditionally, the synthesis of such polymers has been entirely dependent on petroleum-based chemicals. However, as the demand for these polymeric materials increases and the supply of fossil fuel is depleted, there will eventually be a point where supply is insufficient to meet demand.

Accordingly, there is a need for alternate sources for thermoplastic polymer synthesis.

SUMMARY

This summary describes several embodiments of the presently-disclosed subject matter, and in many cases lists variations and permutations of these embodiments. This summary is merely exemplary of the numerous and varied embodiments. Mention of one or more representative features of a given embodiment is likewise exemplary. Such an embodiment can typically exist with or without the feature(s) mentioned; likewise, those features can be applied to other embodiments of the presently-disclosed subject matter, whether listed in this summary or not. To avoid excessive repetition, this summary does not list or suggest all possible combinations of features.

The presently-disclosed subject matter provides, in some embodiments, a thermoplastic polymer including one or more fatty acids derived from a plant-based oil. In some embodiments, the plant-based oil is selected from the group consisting of cottonseed oil, corn oil, soybean oil, rape seed oil, sunflower oil, palm oil, linseed oil, castor oil, peanut oil, and combinations thereof. In some embodiments, the plant-based oil is cottonseed oil. In some embodiments, the thermoplastic polymer includes a structure according to the formula $(C_{18}H_xO_2)_y$, wherein each x is individually selected from the group consisting of 32 and 33, and wherein y is between 1 and 300. In some embodiments, thermoplastic polymer includes a structure according to the formula $C_{18}H_{33}O_2(C_{18}H_{32}O_2)_zC_{18}H_{33}O_3$, wherein z is between 1 and 298. In some embodiments, the thermoplastic polymer includes the following chemical structure:

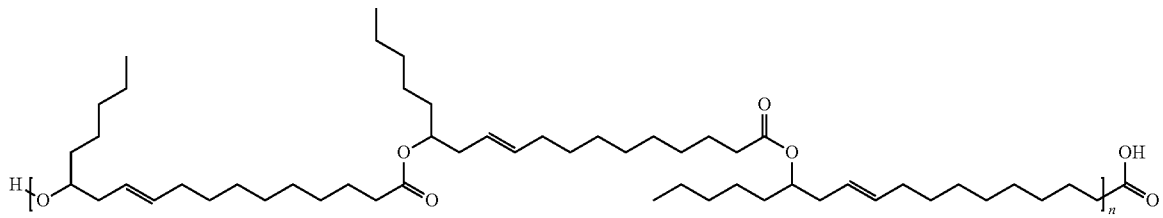

wherein n is between 1 and 100.

The presently-disclosed subject matter also provides, in some embodiments, a method of forming a thermoplastic polymer including epoxidizing a plant-based oil to form an epoxidized plant-based oil; saponifying the epoxidized plant-based oil to separate the fatty acids from the glycerol; and then polymerizing the separated fatty acids to form the thermoplastic polymer. In some embodiments, the plant-based oil includes at least 50% unsaturated fatty acid. In some embodiments, the plant-based oil includes between 60% and 70% unsaturated fatty acid. In some embodiments, the plant-based oil is selected from the group consisting of cottonseed oil, corn oil, soybean oil, rape seed oil, sunflower oil, palm oil, linseed oil, castor oil, peanut oil, and combinations thereof. In some embodiments, the plant-based oil is cottonseed oil.

In some embodiments, the epoxidizing step includes reacting the plant-based oil with peroxy acid. In one embodiments, the epoxidizing step converts at least 60% of the carbon-carbon double bonds in the plant-based oil to more reactive functional groups. In another embodiment, the epoxidizing step converts at least 80% of the carbon-carbon double bonds in the plant-based oil to more reactive functional groups. In another embodiment, the more reactive functional groups include oxirane groups. In some embodiments, the saponifying step includes breaking glycosidic bonds between fatty acids and glycerol molecules of the epoxidized plant-based oil. In one embodiment, the saponifying step includes a saponification reaction with NaOH. In some embodiments, the polymerization step includes esterification with a catalyst solution. In one embodiment, the catalyst solution includes a Ti catalyst solution.

In some embodiments, the method of forming a thermoplastic polymer includes reacting cottonseed oil with peroxy acid to form an epoxidized cottonseed oil; dissociating fatty acids of the epoxidized cottonseed oil from glycerol through a saponification reaction with NaOH; and then polymerizing the dissociated fatty acids through esterification with a Ti catalyst solution to form the thermoplastic polymer; wherein the thermoplastic polymer comprises a structure according to the formula $C_{18}H_{33}O_2(C_{18}H_{32}O_2)_zC_{18}H_{33}O_3$; and wherein z is between 1 and 298.

BRIEF DESCRIPTION OF THE DRAWINGS

The presently-disclosed subject matter will be better understood, and features, aspects and advantages other than those set forth above will become apparent when consideration is given to the following detailed description thereof. Such detailed description makes reference to the following drawings, wherein.

Figure 1:
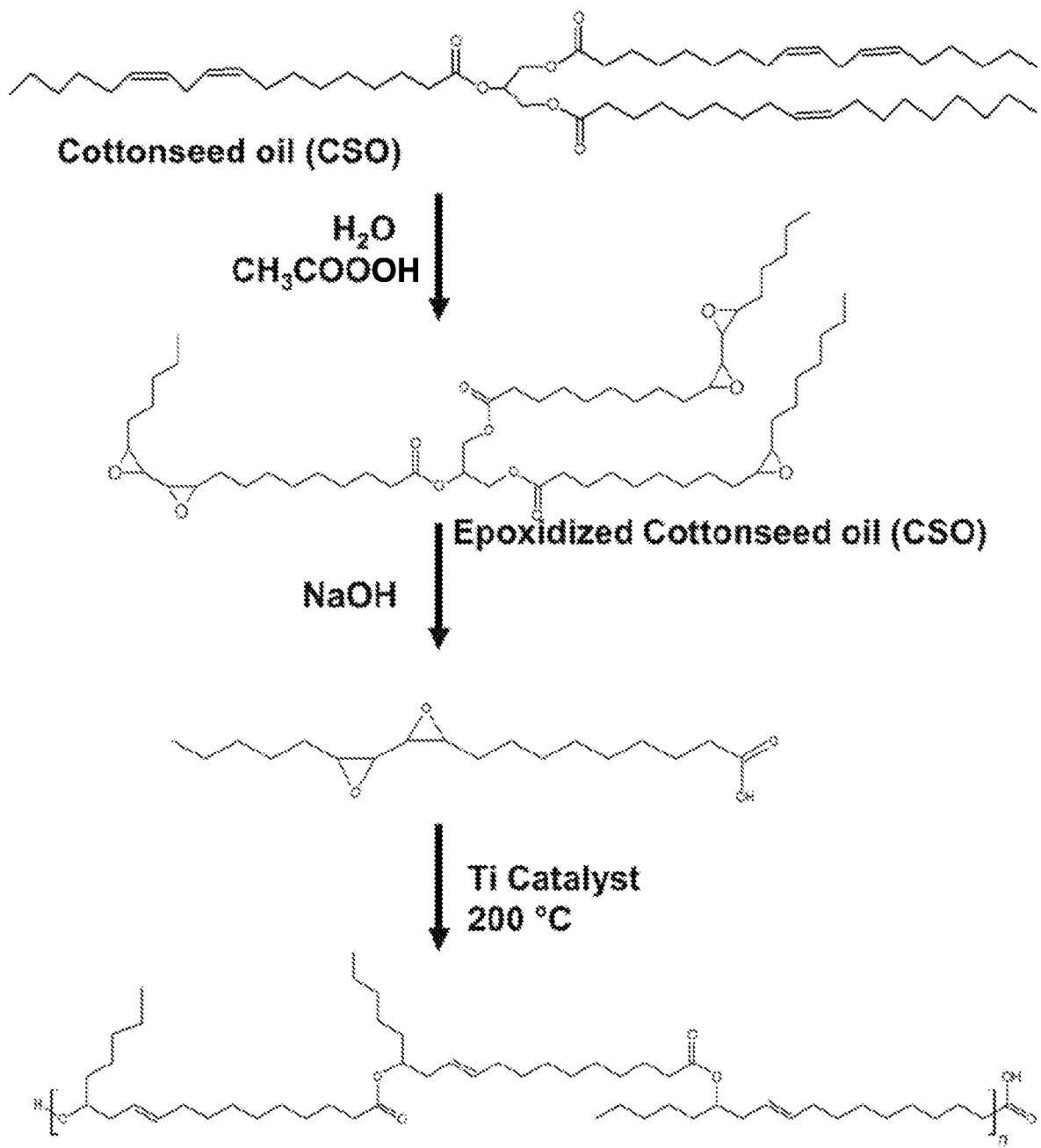
FIG. 1 shows a schematic illustration of the cottonseed oil (CSO) polymer synthesis.

While the disclosure is susceptible to various modifications and alternative forms, specific embodiments thereof have been shown by way of example in the drawings and are herein described below in detail. It should be understood, however, that the description of specific embodiments is not intended to limit the disclosure to cover all modifications, equivalents and alternatives falling within the spirit and scope of the disclosure as defined by the appended claims.

DEFINITIONS

Unless defined otherwise, all technical and scientific terms used herein have the same meaning as commonly understood by one of ordinary skill in the art to which the disclosure belongs. Any methods and materials similar to or equivalent to those described herein can be used in the practice or testing of the present disclosure, including the methods and materials that are described below.

Following long-standing patent law convention, the terms "a," "an," and "the" refer to "one or more" when used in this application, including the claims. Thus, for example, reference to "a lignin source" includes a plurality of lignin sources, and so forth.

The terms "comprising," "including," and "having" are intended to be inclusive and mean that there may be additional elements other than the listed elements.

Unless otherwise indicated, all numbers expressing quantities of ingredients, properties such as reaction conditions, and so forth used in the specification and claims are to be understood as being modified in all instances by the term "about." Accordingly, unless indicated to the contrary, the numerical parameters set forth in this specification and claims are approximations that can vary depending upon the desired properties sought to be obtained by the presently-disclosed subject matter.

As used herein, the term "about," when referring to a value or to an amount of mass, weight, time, volume, concentration, percentage, or the like is meant to encompass variations of in some embodiments ±50%, in some embodiments ±40%, in some embodiments ±30%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed method.

As used herein, ranges can be expressed as from "about" one particular value, and/or to "about" another particular value. It is also understood that there are a number of values disclosed herein, and that each value is also herein disclosed as "about" that particular value in addition to the value itself. For example, if the value "10" is disclosed, then "about 10" is also disclosed. It is also understood that each unit between two particular units is also disclosed. For example, if 10 and 15 are disclosed, then 11, 12, 13, and 14 are also disclosed.

As used herein, the term "plant-based oil" refers to any oil naturally produced by a plant and consisting of triglycerides or triacylglycerols composed of three fatty acids bound to a glycerol backbone.

All combinations of method or process steps as used herein can be performed in any order, unless otherwise specified or clearly implied to the contrary by the context in which the referenced combination is made.

DETAILED DESCRIPTION

The details of one or more embodiments of the presently-disclosed subject matter are set forth in this document. Modifications to embodiments described in this document, and other embodiments, will be evident to those of ordinary skill in the art after a study of the information provided in this document. The information provided in this document, and particularly the specific details of the described exemplary embodiments, is provided primarily for clearness of understanding and no unnecessary limitations are to be understood therefrom. In case of conflict, the specification of this document, including definitions, will control.

The presently-disclosed subject matter relates to methods of forming thermoplastic polymers from plant-based oils. The method includes epoxidizing a plant-based oil to form an epoxidized plant-based oil, saponifying the epoxidized plant-based oil to separate the fatty acids from the glycerol, and then polymerizing the separated fatty acids to form the thermoplastic polymer.

In some embodiments, the epoxidizing step includes reacting the plant-based oil with peroxy acid ($H_3CCOOOH$) to convert at least some of the C=C double bonds in the plant-based oil to more reactive functional groups such as, but not limited to, oxirane groups. In one embodiment, the percentage of the C=C double bonds in the plant-based oil converted to more reactive functional groups during the epoxidizing step includes at least 20%, at least 30%, at least 40%, at least 50%, at least 60%, at least 70%, at least 80%, at least 85%, at least 90%, at least 95%, between 60% and 95%, or any combination, sub-combination, range, or sub-range thereof. In another embodiment, the epoxidizing step includes converting between 60% and 95% of the C=C double bonds in the plant-based oil to more reactive functional groups. In some embodiments, the epoxidizing step also includes adding hydrogen peroxide ($H_2O_2$) and acetic acid ($CH_3COOH$) to produce the peroxy acid.

Following the epoxidizing, the saponifying step includes separating the fatty acids by breaking the glycosidic bonds between the epoxidized fatty acids and the glycerol molecule. Any suitable saponification method may be used to break the glycosidic bonds and separate the fatty acids. For example, in some embodiments, the fatty acids are dissociated from the triglyceride form through saponification reaction with NaOH. The glycerol by-product is then removed by washing, such as, for example, with deionized water.

After saponifying, the separated epoxidized fatty acids form the monomers for the polymerization step. The polymerization may be through any suitable method, and under any suitable reaction conditions, for polymerizing the monomers formed through the epoxidizing and saponifying steps above. For example, without wishing to be bound by theory, it is believed that the epoxidizing step, which converts the unsaturated points (C=C) in the fatty acid chain to more reactive functional groups (e.g., oxirane), facilitates the polymerization of the separated epoxidized fatty acids via esterification reaction. Accordingly, in some embodiments, the polymerization includes esterification with a catalyst solution under vacuum and at an elevated temperature. In one embodiment, the catalyst solution includes a Ti catalyst solution, such as, but not limited to, $Ti(OiPr)_4$ in 1-butanol. In another embodiment, the reaction conditions of the polymerization include reduced pressure of 0.1 mmHg or less, and elevated temperature of 200° C. or more. Additionally or alternatively, in some embodiments, enzymatic catalysts such as lipase can be used. For example, in one embodiment, epoxidized fatty acid and solid supported lipase enzymes are added in toluene. In another embodiment, the enzymatic catalysts are added at a temperature of between 50° C. and 70° C. Although described above with respect to specific pressure and temperature, as will be appreciated by those skilled in the art, the reaction conditions of the polymerization reaction will vary depending upon the specific monomers and catalyst being used and expressly include any other suitable reaction conditions.

The methods disclosed herein may be utilized to form thermoplastic polymers from any plant-based oil containing a suitable amount of an unsaturated fatty acid. A suitable amount of the unsaturated fatty acid includes, but is not limited to, 0.5% to 70%, 1% to 70%, 5% to 70%, 10% to 70%, 15% to 70%, 20% to 70%, 25% to 70%, or any combination, sub-combination, range, or sub-range thereof. In some embodiments, such plant-based oils include, but are not limited to, cottonseed, corn, soybean, rape seed, sunflower, palm, linseed, castor, peanut, or a combination thereof. For example, in one embodiment, the plant-based oil includes cottonseed oil (CSO) having between 65 and 70% unsaturated fatty acid (linoleic and oleic). In another embodiment, as illustrated in FIG. 1, the method includes epoxidizing CSO to form epoxidized CSO (ECSO); saponifying the ECSO to separate the fatty acids from the glycerol and open up the carboxylic functional groups of the fatty acids; and then polymerizing the separated fatty acids under suitable conditions (e.g., catalyst, temperature, pressure).

As compared to cellulose, starch, and proteins, the unsaturated fatty acids of the plant-based oils discussed herein have a unique chemical structure which provides a good stage for establishing the polymerization reaction. CSO, for example, has a 2:1 ratio of polyunsaturated to saturated fatty acids. More specifically, CSO includes 65-70% unsaturated fatty acids, with 18-24% being monounsaturated (oleic) fatty acids, 42-52% being polyunsaturated (linoleic) fatty acids, and 26-35% being saturated (palmitic and stearic) fatty acids.

Also provided herein, in some embodiments, is a thermoplastic polymer formed from the fatty acids of one or more plant-based oils. Suitable plant-based oils include, but are not limited to, cottonseed, corn, soybean, rape seed, sunflower, palm, linseed, castor, peanut, any other plant-based oil having a suitable amount of unsaturated fatty acid, or a combination thereof. For example, in one embodiment, the thermoplastic polymer is formed from the fatty acids of CSO and/or ECSO. In some embodiments, the fatty acids from the plant-based oils are unsaturated fatty acids with eighteen carbon atoms. In some embodiments, the chemical structure of the plant-based thermoplastic polymers is generally represented as $(C_{18}H_xO_2)_y$, where each x is individually selected from 32 or 33, and y is between 1 and 300, between 5 and 300, between 10 and 300, between 1 and 250, between 1 and 200, between 1 and 150, between 1 and 100, between 1 and 75, between 1 and 50, between 1 and 40, between 1 and 30, between 1 and 20, between 5 and 15, about 10, or any combination, sub-combination, range, or sub-range thereof. In some embodiments, the chemical structure of the plant-based thermoplastic polymers is $C_{18}H_{33}O_2(C_{18}H_{32}O_2)_zC_{18}H_{33}O_3$, where z is between 1 and 300, between 1 and 298, between 3 and 298, between 8 and 298, between 10 and 300, between 10 and 298, between 1 and 250, between 1 and 200, between 1 and 150, between 1 and 100, between 1 and 75, between 1 and 50, between 1 and 40, between 1 and 30, between 1 and 20, between 1 and 18, between 3 and 18, between 3 and 13, about 10, about 8, or any combination, sub-combination, range, or sub-range thereof. In some embodiments, the chemical structure of the plant-based thermoplastic is:

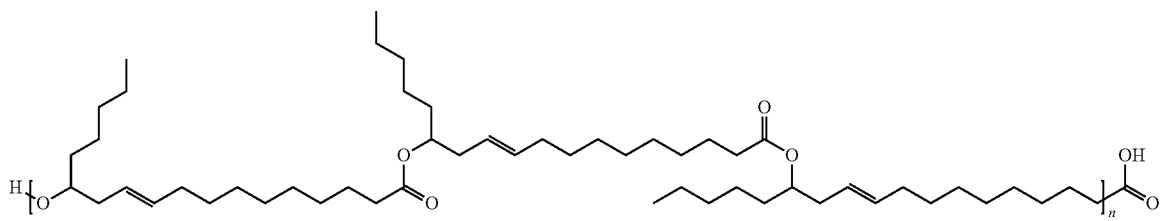

where n is between 1 and 100, between 1 and 90, between 1 and 80, between 1 and 70, between 1 and 60, between 1 and 50, between 1 and 40, between 1 and 30, between 1 and 25, between 1 and 20, between 1 and 15, between 1 and 10, between 1 and 9, between 1 and 8, between 1 and 7, between 1 and 6, between 1 and 5, between 1 and 4, between 1 and 3, or any combination, sub-combination, range, or sub-range thereof.

The formation of thermoplastic polymers from plant-based oils, as disclosed herein, provides a highly desirable alternative to the existing petroleum-based sources. Not only are the plant-based oils renewable and carbon-neutral, they are also non-toxic, biodegradable, and abundantly available. These polymers may be employed in many different articles and/or processes, such as, but not limited to, filament extrusion and/or injection mold manufacturing. Accordingly, further provided herein, in some embodiments, are methods of filament extrusion and/or injection mold manufacturing utilizing one or more of the polymers disclosed herein, as well as article formed therefrom incorporating one or more of the polymers disclosed herein.

The presently-disclosed subject matter is further illustrated by the following specific but non-limiting examples. The following examples may include compilations of data that are representative of data gathered at various times during the course of development and experimentation related to the presently-disclosed subject matter.

EXAMPLES

Example 1

This Example illustrates the synthesis and characterization of thermoplastic polymer from CSO fatty acid.

Methods and Materials

Materials

The purified cottonseed oil (CSO) was purchased from a commercial source with an iodine value between 109 and 120 with a density of 0.92 g/cm$^3$. Hydrogen peroxide (50% v/v Sigma-Aldrich) was used for the epoxide process along with the glacial acetic acid (Sigma-Aldrich) and sulfuric acid (Sigma-Aldrich).

Epoxidation of Cottonseed Oil

Three-neck round-bottom flask (250 mL) with reflux condenser was used to carry out the epoxidation reaction. Cottonseed oil (94 g) was heated up to 55° C. using heating metal and magnetic stirrer. After cottonseed oil reached to the desired temperature, glacial acetic acid (9.8 mL) and sulfuric acid (0.8 mL) were introduced to the reaction and maintained the temperature (55° C.) for another 10 min. After 10 min at 55° C., hydrogen peroxide (58 mL) was added to the reaction mixture drop by drop using a syringe to trigger the onset reaction. After adding all the $H_2O_2$, the reaction temperature was increased to 70° C. and maintained for 8 h. After completion of the reaction, the product was collected by using solvent extraction, ethyl ether. Collected product was characterized by using FTIR and the NMR to determine chemical properties. Also, iodine analysis was conducted using ASTM D5554-15 method to determine the number of unsaturated carbon bonds in the epoxide cottonseed oil.

Saponification of Epoxide Cottonseed Oil

Fatty acids in natural oils present as the triglyceride form. This means three fatty acids make one molecule via bridging through a glycerol molecule (shown in FIG. 1). Fatty acids are separated by breaking the glycosidic bonds. Saponification reaction with NaOH was used to dissociate the fatty acid from triglyceride form and the by-product glycerol was removed using washing with deionized water.

Epoxide Fatty Acid Polymerization

In this experiment, polymerizations were conducted in a 100 mL batch reactor (Parr) equipped with a mechanical overhead stirrer, nitrogen inlet, and vacuum line. Monomer (10 g) and a predetermined amount of catalyst solution (10 mg/mL Ti(OiPr)$_4$ in 1-butanol) were transferred to the reactor. The system was placed under vacuum (0.1 mmHg) and purged with N$_2$ gas, and this cycle was repeated three times. Subsequently, under N$_2$ gas, first stage of the reaction was conducted for 2 h at 200° C. Thereafter, the second stage of the polymerization was performed by: (i) raising the temperature to 220° C., (ii) placing the contents of the reactor under reduced pressure (0.1 mmHg), and (iii) maintaining these reaction conditions for 4 h. After performing the reactions, products were analyzed using gel permeation chromatography (GPC) to determine the molecular weight of the polymer. Differential scanning calorimetry (DCS) was conducted to determine thermal properties of the polymer.

Results and Discussion

Synthesis of Epoxidized Cottonseed Oil

Figure 2:
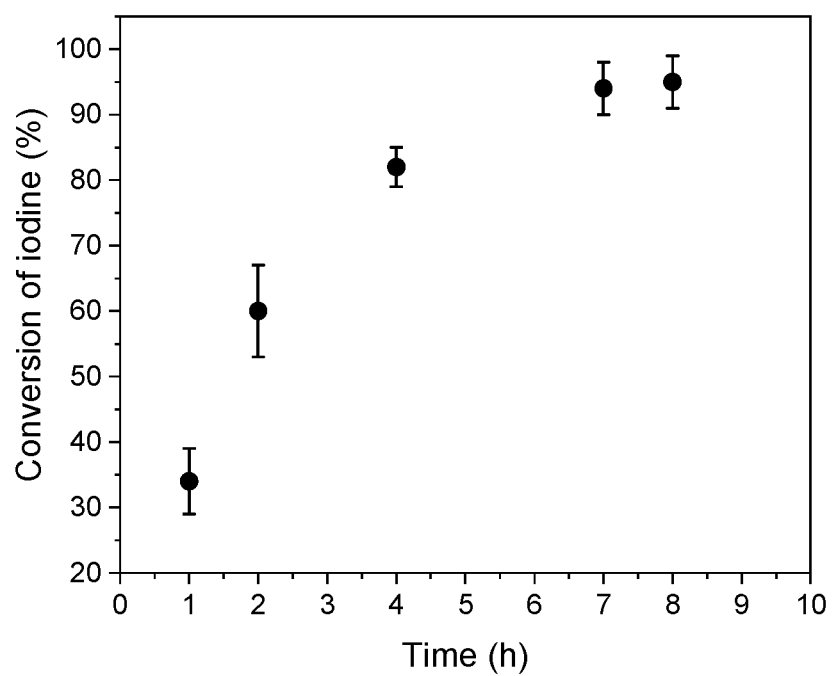
FIG. 2 shows a graph illustrating conversion of iodine percentage with epoxidation reaction time.
Figure 3A:
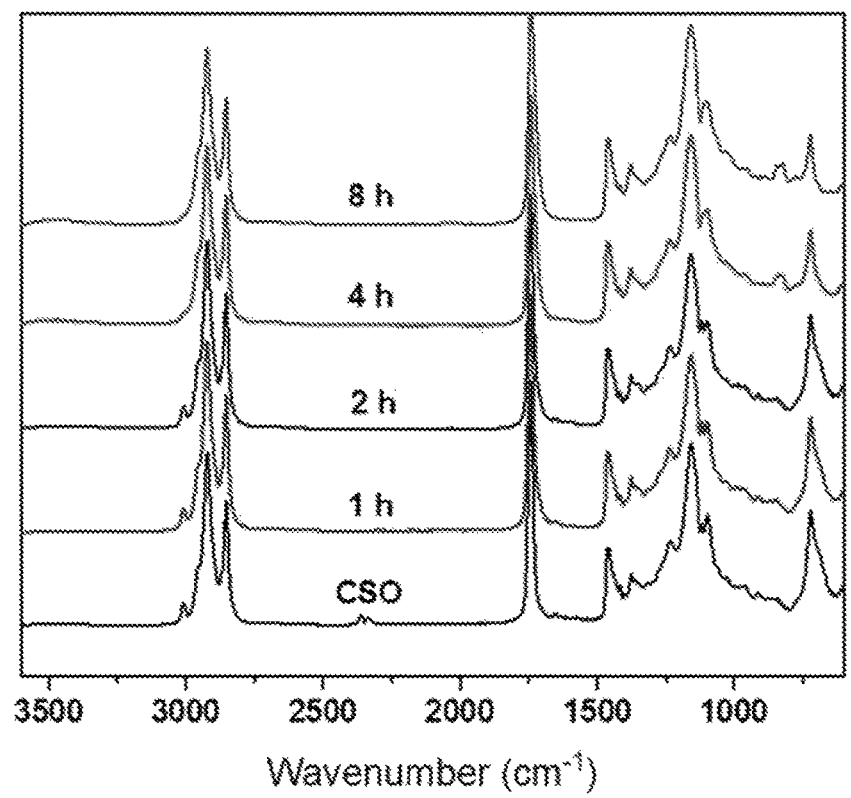
FIGS. 3A-C show graphs comparing FTIR spectrums of epoxidation reaction products with CSO. (A) Shows a graph comparing FTIR spectrums of epoxidation reaction products after 1 h, 2 h, 4 h, and 8 h reaction times with CSO. (B) Shows a graph comparing the FTIR spectrums of the 8 h reaction time with CSO over a section of the wavenumber of (A). (C) Shows a graph comparing the FTIR spectrums of the 8 h reaction time with CSO over a section of the wavenumber of (A).
Figure 3B:
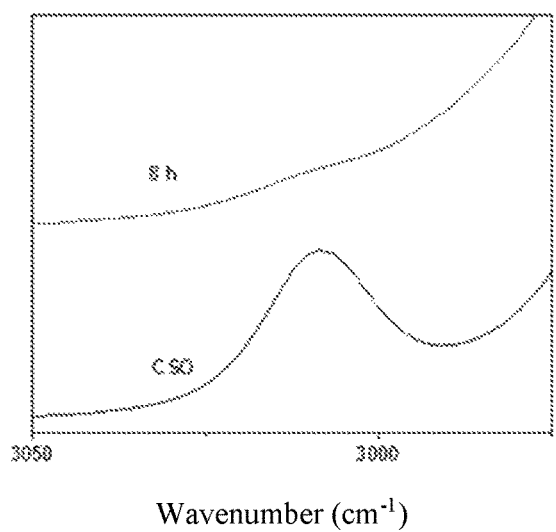
Figure 3C:
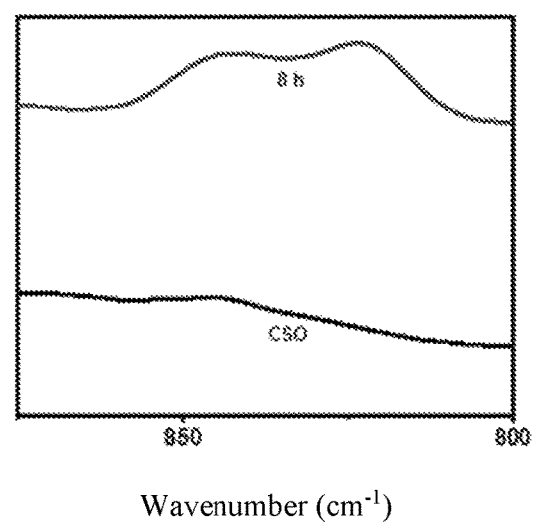

Cottonseed oil consists of 65-70% unsaturated fatty acid. The C=C bonds are feasible to undergo epoxidation reaction and convert C=C into oxirane groups. As shown in FIG. 1, during the first reaction, peroxyacid (H$_3$CCOOOH) was produced by reacting H$_2$O$_2$ and acetic acid. Then, peroxyacid initiated the epoxidation reaction and produced the epoxided cottonseed oil (ECSO). Percentage of C=C conversion was evaluated by using iodine value. As shown in FIG. 2, during the first two hours of the reaction, 60% conversion of iodine was observed and it reached to maximum of 95% in 7 h. In addition, as illustrated in FIGS. 3A-C, FTIR spectrum revealed the conversion of C=C. In the FTIR spectrum, absorption peak at 3015 cm$^{-1}$ represents the =C—H (stretching) (FIGS. 3A-B). This peak intensity started to reduce with the epoxidation reaction time and faded after 7 h. In comparison with the NMR spectrum of CSO and ECSO, the presence of oxirane bonds in ECSO was revealed. The very weak minor bands displayed by the FT-IR at 1651.0 cm$^{-1}$ and 3052.0 cm$^{-1}$ were due to the CH=CH stretching. These bands also started to diminish as the epoxidation reaction progressed. However, a new band appeared in the spectra of epoxidized CSO at 823.0 cm$^{-1}$ attributed to epoxy groups (FIG. 3C). The intensity of this band increased with the increasing progress of epoxidation reaction.

Figure 4A:
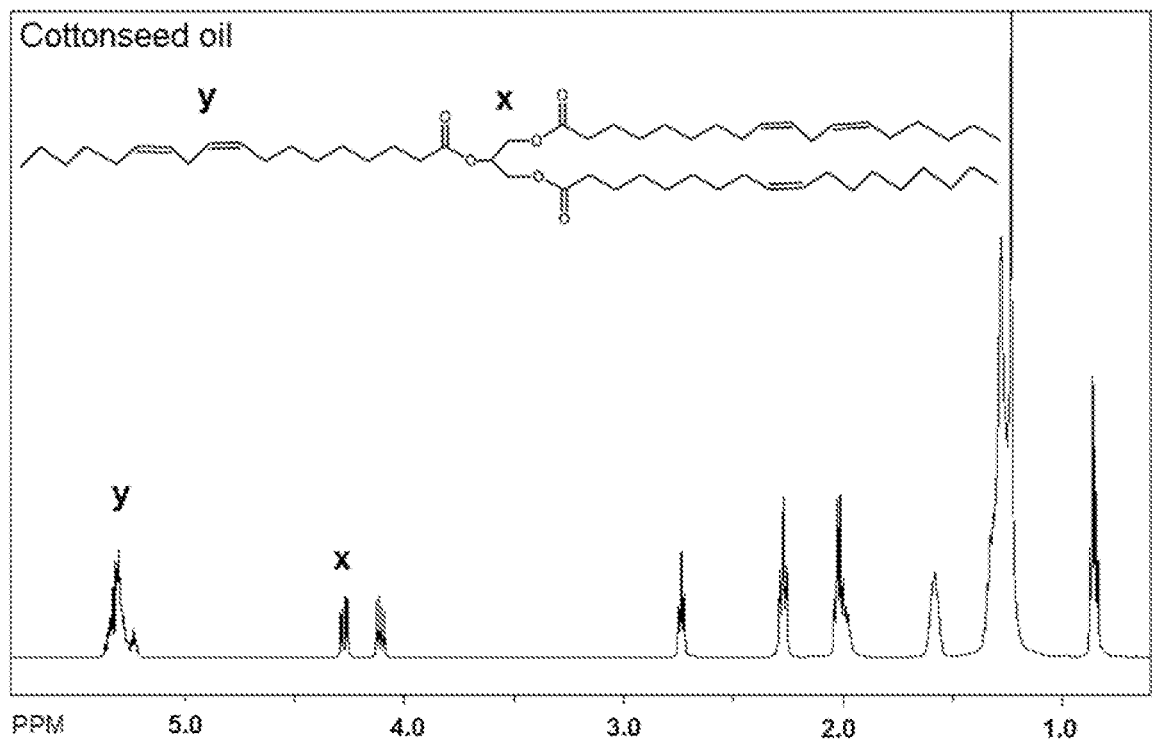
FIGS. 4A-B show graphs illustrating NMR spectrum of cottonseed oil (CSO) and epoxidized cottonseed oil (ECSO). (A) Shows a graph illustrating the NMR spectrum of CSO. (B) Shows a graph illustrating the NMR spectrum of ECSO.
Figure 4B:
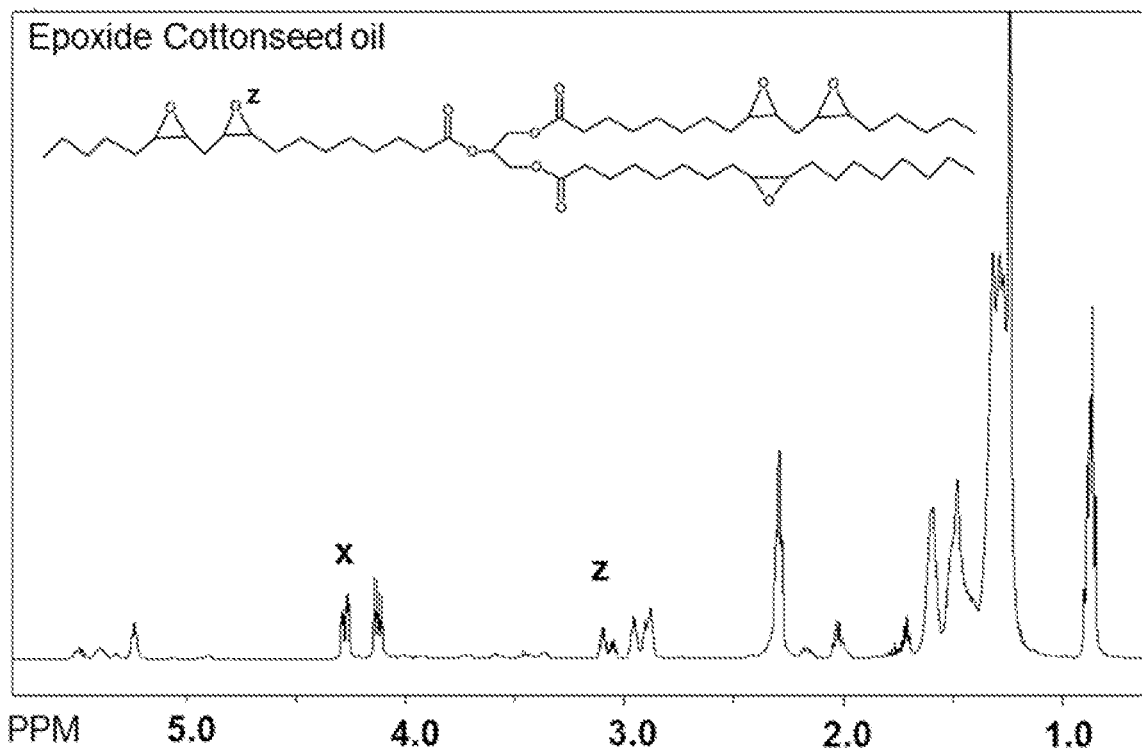

When comparing the $^1$H NMR spectra of CSO (FIG. 4A) and ECSO (FIG. 4B), resonances appeared in both spectra between 3.8 and 4.4 ppm. This can be identified as glycerol center in the triglycerides. Three carbons in triglycerides center have two different chemical environments, which gives two different resonances. Also, NMR spectrum of CSO indicates the presence of C=C, due to the resonances appearance at the δ=5.2-5.5 ppm. However, C=C resonance peaks disappeared in the ECSO NMR spectrum and new resonance has appeared at a range of 2.8-3.2 ppm. These new resonance peaks are responsible to H atom at the newly formed oxirane rings. Therefore, in comparison of CSO and ECSO NMR spectra, it explains the conversion of C=C to oxirane during the epoxidation reaction.

Figure 5:
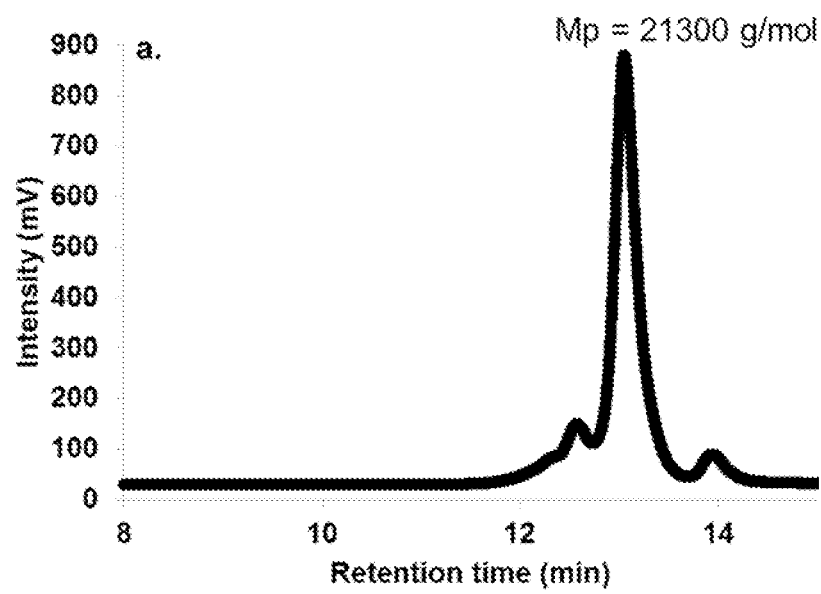
FIG. 5 shows a graph illustrating the GPC spectrum of a fatty acid polymer synthesized with titanium catalyst polymerization.

Referring to FIG. 5, GPC spectrum clearly display polymerization of fatty acid by using both these catalytic reaction methods. Titanium catalyst polymerization tends to produce a high molecular weight polymer. Multiple peaks were observed in the GPC spectra of the polymerization products. However, higher molecular weight polymer predominated. This indicates a successful synthesis route using these catalytic processes.

Figure 6:
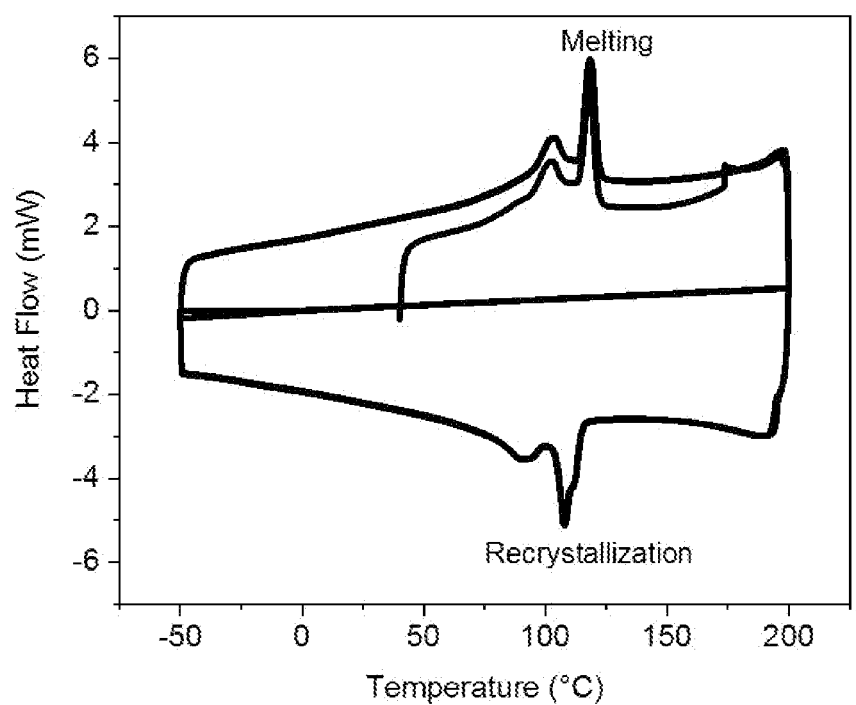
FIG. 6 shows a graph illustrating DCS thermogram of CSO fatty acid polymer.

Furthermore, as illustrated in FIG. 6, DCS thermogram revealed the thermoplastic properties of this novel fatty acid polymer. According to the thermogram, the polymer exhibited melting (endothermic heat flow) between 110-120° C. and recrystallization (exothermic heat flow) between 95-105° C.

CONCLUSION

As shown in this Example, a novel plant oil based thermoplastic polymer synthesis reaction scheme has been revealed. The thermal properties (DCS thermogram) have confirmed the melting and recrystallization ability of the polymer, while the GPC spectra has exhibited the peak molecular weight around 21300 g/mole. Based upon these properties, the polymer is a suitable alternative for petroleum based thermoplastic polymers.

What is claimed is:

1. A method of forming a non-crosslinked thermoplastic polymer, the method comprising:
    epoxidizing a plant-based oil to form an epoxidized plant-based oil;
    saponifying the epoxidized plant-based oil to separate fatty acids from glycerol; and then
    polymerizing the separated fatty acids to form the thermoplastic polymer;
    wherein in the polymerizing step includes esterification with a titanium isoperoxide catalyst solution under vacuum and at an elevated temperature;
    wherein after esterification of the polymerization the reaction temperature is raised to at least 200° C. under reduced pressure; and
    wherein the thermoplastic polymer exhibits melting between 110-120° C. and recrystallization between 95-105° C.

2. The method of claim 1, wherein the plant-based oil includes at least 50% unsaturated fatty acid.

3. The method of claim 1, wherein the plant-based oil includes between 60% and 70% unsaturated fatty acid.

4. The method of claim 1, wherein the plant-based oil is selected from the group consisting of cottonseed oil, corn oil, soybean oil, rape seed oil, sunflower oil, palm oil, linseed oil, castor oil, peanut oil, and combinations thereof.

5. The method of claim 1, wherein the plant-based oil is cottonseed oil.

6. The method of claim 1, wherein the epoxidizing step includes reacting the plant-based oil with peroxy acid.

7. The method of claim 6, wherein the epoxidizing step converts at least 60% of the carbon-carbon double bonds in the plant-based oil to more reactive functional groups.

8. The method of claim 7, wherein the epoxidizing step converts at least 80% of the carbon-carbon double bonds in the plant-based oil to more reactive functional groups.

9. The method of claim 7, wherein the more reactive functional groups include oxirane groups.

10. The method of claim 1, wherein the saponifying step includes breaking glycosidic bonds between fatty acids and glycerol molecules of the epoxidized plant-based oil.

11. The method of claim 10, wherein the saponifying step includes a saponification reaction with NaOH.

\* \* \* \* \*